United States Patent
Nagai (10) Patent No.: US 8,049,849 B2
(45) Date of Patent: Nov. 1, 2011

(54) OPTICAL FILM, POLARIZING PLATE, AND LIQUID CRYSTAL DISPLAY DEVICE

(75) Inventor: Michio Nagai, Kanagawa (JP)

(73) Assignee: FUJIFILM Corporation, Minato-Ku, Tokyo (JP)

(*) Notice: Subject to any disclaimer, the term of this patent is extended or adjusted under 35 U.S.C. 154(b) by 452 days.

(21) Appl. No.: 12/408,152

(22) Filed: Mar. 20, 2009

(65) Prior Publication Data

US 2009/0237598 A1    Sep. 24, 2009

(30) Foreign Application Priority Data

Mar. 24, 2008   (JP) ................... 2008-075267

(51) Int. Cl.
    *G02F 1/13363* (2006.01)
(52) U.S. Cl. ..................... 349/117; 349/119
(58) Field of Classification Search .............. None
    See application file for complete search history.

(56) References Cited

U.S. PATENT DOCUMENTS 7,929,087 B2 * 4/2011 Nagai ........................ 349/117
2003/0086027 A1 * 5/2003 Uchiyama et al. ............... 349/1
2008/0151373 A1 * 6/2008 Sekiguchi et al. ............ 359/497
2009/0174846 A1 * 7/2009 Ito .................................. 349/96

FOREIGN PATENT DOCUMENTS

| JP | 2006-208604 A | | 8/2006 |
| JP | 2007-51210 A | * | 3/2007 |
| JP | 2007-298960 A | | 11/2007 |

* cited by examiner

*Primary Examiner* — Mike Stahl
(74) *Attorney, Agent, or Firm* — Buchanan Ingersoll & Rooney PC (57) ABSTRACT

The present invention provides an optical film including at least two optically anisotropic layers, wherein one optically anisotropic layer satisfies Expression (1) described below, the other optically anisotropic layer satisfies Expression (2) described below, and a slow axis of the one optically anisotropic layer is parallel to a slow axis of the other optically anisotropic layer, $$0 \leq Re(450)/Re(550) \leq 0.5 \quad \text{Expression (1)}$$

$$0.95 \leq Re(450)/Re(550) \leq 1.05 \quad \text{Expression (2)}$$

where Re (λ) represents an in-plane retardation value (unit: nm) of the corresponding optically anisotropic layer measured at a wavelength of λ nm.

8 Claims, 1 Drawing Sheet

OPTICAL FILM, POLARIZING PLATE, AND LIQUID CRYSTAL DISPLAY DEVICE

BACKGROUND OF THE INVENTION

1. Field of the Invention

The present invention relates to an optical film, a polarizing plate using the optical film, and a liquid crystal display device having the optical film.

2. Description of the Related Art

There has been known a liquid crystal display device equipped with a liquid crystal cell containing rod-shaped liquid crystalline molecules, and a pair of polarizing plates sandwiching therein the liquid crystal cell. Polarizing plates of this type liquid crystal display device are each provided with an optical film for adjusting a phase difference of light passed through the liquid crystal cell, i.e., for optical compensation.

As an optical film, for example, there have been known an optical film in which an optically anisotropic layer containing a liquid crystal compound, such as a discotic compound, is stacked over a support excellent in optical transmission and optical isotropy, such as triacetylcellulose.

This type of optical film has a phase difference which differs on a wavelength-to-wavelength basis of transmission light, and usually, has wavelength dispersibility.

The wavelength dispersibility of an optical film has an influence on the display properties of a liquid crystal display device, such as color tint. Therefore, there have been attempts to develop optical films capable of improving display properties of liquid crystal display devices.

For example, Japanese Patent Application Laid-Open (JP-A) No. 2006-208604 proposes an optical film in which a birefringent film is stacked over an optically anisotropic layer formed of a polymer film such as cycloolefin-based polymer. The birefringent film is said to have a relationship between in-plane retardation value Re ($\lambda$) and wavelength $\lambda$ (nm) of Re (450)/Re (550)>1.08.

Also, the optical film is formed so that a slow axis of an optically anisotropic layer is substantially orthogonal to a slow axis of the birefringent film.

Japanese Patent Application Laid-Open (JP-A) No. 2007-298960 proposes an optical film having a transparent protective layer which has a plane phase difference value of 0.97 or more and less than 1.03 (0.97<R (450 nm)/R (550 nm)<1.03).

Japanese Patent Application Laid-Open (JP-A) No. 2007-298960 discloses to use as an optical film a resin film exhibiting so-called reverse wavelength dispersibility in which as the wavelength is longer, the phase difference is greater.

JP-A Nos. 2006-208604 and 2007-298960, however, do not disclose nor suggest that it is possible to improve all of the contrast, color tint and bilateral symmetry property of a liquid crystal display device by use of an optical film in which, among optically anisotropic layers other than the optically anisotropic layer containing a liquid crystal compound, an optically anisotropic layer that exhibits wavelength dispersibility satisfying the following Expression (1) and an optically anisotropic layer that exhibits wavelength dispersibility satisfying the following Expression (2) are laminated so that slow axes thereof are parallel to each other.

$0 \leq Re(450)/Re(550) \leq 0.5$   Expression (1)

$0.95 \leq Re(450)/Re(550) \leq 1.05$   Expression (2)

BRIEF SUMMARY OF THE INVENTION

The present invention is aimed at solving problems in related art and achieving the following object.

Specifically, an object of the present invention is to provide an optical film capable of improving all of contrast, color tint and bilateral symmetry property of a liquid crystal display device, a polarizing plate using the optical film, and a liquid crystal display device provided with the polarizing plate.

The present inventors carried out extensive studies and examinations and found that all of contrast, color tint, and bilateral symmetry property of a liquid crystal display device can be improved by use of an optical film having at least two optically anisotropic layers, wherein one optically anisotropic layer satisfies the following Expression (1), the other optically anisotropic layer satisfies the following Expression (2), and a slow axis of the one optically anisotropic layer is parallel to a slow axis of the other optically anisotropic layer, In particular, the present inventors found that by using such an optical film, it is possible to improve all of contrast, color tint, and bilateral symmetry property of TN mode liquid crystal display devices.

$0 \leq Re(450)/Re(550) \leq 0.5$   Expression (1)

$0.95 \leq Re(450)/Re(550) \leq 1.05$   Expression (2)

The present invention is based on the findings of the present inventors. Means for solving the above-mentioned problems are as follows:

<1> An optical film including:

at least two optically anisotropic layers, wherein one optically anisotropic layer satisfies the following Expression (1), the other optically anisotropic layer satisfies the following Expression (2), and a slow axis of the one optically anisotropic layer is parallel to a slow axis of the other optically anisotropic layer, $0 \leq Re(450)/Re(550) \leq 0.5$   Expression (1)

$0.95 \leq Re(450)/Re(550) \leq 1.05$   Expression (2)

where Re ($\lambda$) represents an in-plane retardation value (unit: nm) of the corresponding optically anisotropic layer measured at a wavelength of $\lambda$ nm.

In the optical film including at least two optically anisotropic layers according to the item <1>, one optically anisotropic layer satisfies the above Expression (1), the other optically anisotropic layer satisfies the above Expression (2), and a slow axis of the one optically anisotropic layer is parallel to a slow axis of the other optically anisotropic layer, thereby making it possible to improve all of the contrast, color tint, and bilateral symmetry property of the resulting liquid crystal display device.

<2> The optical film according to the item <1>, being a two-layered laminate composed of a first optically anisotropic layer and a second optically anisotropic layer, wherein the two-layered laminate satisfies the following Expression (3), $0.75 \leq Re(450)/Re(550) \leq 0.95$   Expression (3)

where Re ($\lambda$) represents an in-plane retardation value (unit: nm) of the laminate measured at a wavelength of $\lambda$ nm.

<3> The optical film according to any one of the items <1> and <2>, further including a liquid crystal optically anisotropic layer which contains a liquid crystal compound.

<4> The optical film according to the item <3>, wherein the liquid crystal compound contains a discotic liquid crystal compound.

<5> The optical film according to any one of the items <1> to <4>, wherein the one optically anisotropic layer satisfying Expression (1) contains cellulose acetate, and the other optically anisotropic layer satisfying Expression (2) contains at least one of a cyclic olefin homopolymer and a cyclic olefin copolymer.

<6> A polarizing plate including at least:
 the optical film according to any one of the items <1> to <5>, and
 a polarizer.
<7> A liquid crystal display device including at least:
 a liquid crystal cell, and
 the polarizing plates according to the item <6>.
<8> The liquid crystal display device according to the item <7>, wherein the liquid crystal cell is a TN mode liquid crystal cell or an OCB mode liquid crystal cell.

The present invention can provide an optical film capable of improving all of contrast, color tint, and bilateral symmetry property of a liquid crystal display device, a polarizing plate using the optical film as well as a liquid crystal display device provided with the polarizing plate.

DETAILED DESCRIPTION OF THE INVENTION

In the present invention, Re ($\lambda$) represents an in-plane retardation value (unit: nm) of a film-shaped measurement target, such as an optically anisotropic layer, a film, and a laminate, at a wavelength $\lambda$ (nm); and Rth ($\lambda$) represents a retardation value (unit: nm) in a thickness direction of the film-shaped measurement target, at a wavelength $\lambda$ (nm).

In the present invention, Re ($\lambda$) represents an in-plane retardation value at a wavelength $\lambda$ and Rth ($\lambda$) represents a retardation value in a thickness direction at a wavelength $\lambda$.

The value of Re ($\lambda$) is measured using a KOBRA 21 ADH or WR (manufactured by Ohji Keisoku Kiki Co.) so that a light beam having a wavelength of $\lambda$ nm is incident in a normal direction on a film-shaped measurement target.

As a method of changing a measurement wavelength, there are the following methods: a method of manually replacing a wavelength-selecting filter with a new one, a method of converting a measurement value through the use of a program.

When the film-shaped target to be measured is represented by a uniaxial or biaxial index ellipsoid, the Rth ($\lambda$) is calculated by the following method.

A light beam having a wavelength of $\lambda$ nm is incident on the film-shaped measurement target in its normal direction of the measurement target, with its in-plane slow axis (determined by a KOBRA 21 ADH or WR) being regarded as a tilt axis (rotation axis), from its inclined direction of the tilt angle to measure Re values ($\lambda$) of 6 points in total in 10-degree increments up to 50° of one side of the measurement target from the normal direction. Then, an Rth ($\lambda$) value is calculated by means of a KOBRA 21 ADH or WR based on the measured retardation (Re) values, an assumed value of average refractive index and an inputted film thickness value. When the film-shaped measurement target has no slow axis, an arbitrary direction in the plane of the measurement target is regarded as a "rotation axis".

In the above-mentioned measurement, in the case where a film-shaped measurement target has an in-plane slow axis in its plane as a rotation axis along a direction where the retardation value is zero at a certain angle tilted (at a certain tilted angle) from its normal direction of the film-shaped measurement target, a retardation value measured at a tilt angle greater than the certain tilted angle is reversed in sign (to a value in minus), and then the value of Rth ($\lambda$) is determined by a KOBRA 21 ADH or WR.

Note that a retardation value is measured from arbitrarily selected two directions with its slow axis of a measurement target being regarded as a tilt axis (rotation axis), an Rth value can also be calculated based on the measured retardation values, an assumed value of refractive index, and an inputted film thickness value from the following Expressions (A) and (B). When the film-shaped measurement target has no slow axis, an arbitrary direction in the plane of the measurement target is regarded as a "rotation axis".

$$Re(\theta) = \left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}} \quad \text{Expression (A)}$$

Note that in Expression (A), Re ($\theta$) represents a retardation value in a direction inclined at an angle $\theta$ from a normal direction; nx represents a refractive index in an in-plane slow axis direction; ny represents a refractive index in a direction going straight to the nx; nz represents a refractive index in a direction orthogonal to the nx and the ny; and d represents a film thickness.

$$Rth = ((nx+ny)/2 - nz) \times d \quad \text{Expression (B)}$$

When a film-shaped measurement target to be measured is the one that cannot be represented by a uniaxial or biaxial index ellipsoid, i.e., a film-shaped measurement target having no so-called optical axis, the Rth ($\lambda$) value is calculated by the following method.

A light beam having a wavelength of $\lambda$ nm is incident on the film-shaped measurement target in its normal direction of the measurement target, with its in-plane slow axis (determined by a KOBRA 21 ADH or WR) being regarded as a tilt axis (rotation axis), from its inclined direction of the tilt angle to measure Re values ($\lambda$) of 11 points in total in 10-degree increments of −50° up to 50° from the normal direction. Then, an Rth ($\lambda$) value is calculated by means of a KOBRA 21 ADH or WR based on the measured retardation values, an assumed value of average refractive index and an inputted film thickness value.

In the above measurement, as for the assumed value of average refractive index, a value described in "Polymer Handbook" (JOHN WILEY & SONS, INC.) and catalogues of various optical films can be used. A value of average refractive index that has not been known can be measured by means of an Abbe refractometer. Values of average refractive index of main optical films are exemplarily described as follows: celluloseacylate (1.48), cycloolefin polymer (1.52), polycarbonate (1.59), polymethyl methacrylate (1.49), and polystyrene (1.59). KOBRA 21 ADH or WR calculates values of nx, ny, and nz by inputting the assumed value of average refractive index and the film thickness. Based on the calculated values of nx, ny and nz, a value of Nz is further calculated by the equation, Nz=(nx−nz)/(nx−ny).

In the present invention, the term "slow axis" of a film-shaped measurement target such as an optically anisotropic layer, a film, and a laminate, and represents a direction where the refractive index is maximum. In the measurement of a slow axis of the measurement target, for example, KOBRA 21DH (manufactured by Ohji Keisoku Kiki Co.) can be used.

Also, in the present invention, an angle of "45°" and the terms "orthogonal to" and "parallel to" mean values less than values in the range of ±5° of a strict angle. The margin of error relative to the strict angle is preferably smaller than 4°, and more preferably smaller than 3°.

[Optical Film]

The optical film of the present invention has at least two optically anisotropic layers. In the two optically anisotropic layers, one optically anisotropic layer satisfies the following Expression (1), and the other optically anisotropic layer satisfies the following Expression (2).

Note that in the two optically anisotropic layers, the one optically anisotropic layer is referred to as "a first optically anisotropic layer", and the other optically anisotropic layer is referred to as "a second optically anisotropic layer".

$$0 \leq Re(450)/Re(550) \leq 0.5 \quad \text{Expression (1)}$$

$$0.95 \leq Re(450)/Re(550) \leq 1.05 \quad \text{Expression (2)}$$

Note that the first optically anisotropic layer and the second optically anisotropic layer are disposed so that a slow axis of the first optically anisotropic layer and a slow axis of the second optically anisotropic layer are parallel to each other.

An optical film, in which a first optically anisotropic layer satisfying Expression (1) and a second optically anisotropic layer satisfying Expression (2) are laminated, has a high-design freedom of wavelength dispersibility.

Further, it is preferable that in the optical film, a laminate formed of the first optically anisotropic layer and the second optically anisotropic layer satisfies the following Expression (3).

$$0.75 \leq Re(450)/Re(550) \leq 0.95 \quad \text{Expression (3)}$$

The above-mentioned optical film is further designed so that the value of Re (550) of the second optically anisotropic layer is greater than the value of Re (550) of the first optically anisotropic layer, and a two-layered laminate formed of the first optically anisotropic layer and the second optically anisotropic layer satisfies the above Expression (3), thereby making it possible to improve the contrast and color tint of the resulting liquid crystal display device.

Furthermore, when the value of Re (450)/Re (550) is smaller than 0.75, the color tint of the resulting liquid crystal display device may degrade. When the value is 0.95 or higher, the contrast view angle of the resulting liquid crystal display device may degrade.

Note that when the value of Re (550) of the second optically anisotropic layer is greater than the value of Re (550) of the first optically anisotropic layer, the two-layered laminate can easily satisfy the above Expression (3).

The following explains the first optically anisotropic layer and the second optically anisotropic layer constituting the optical film.

(First Optically Anisotropic Layer)

As described above, the first optically anisotropic layer satisfies the following Expression (1).

$$0 \leq Re(450)/Re(550) \leq 0.5 \quad \text{Expression (1)}$$

The value of Re (450) of the first optically anisotropic layer is preferably 0 nm to 25 nm, more preferably 1 nm to 15 nm, and still more preferably 2 nm to 10 nm.

The value of Re (550) of the first optically anisotropic layer is preferably 0 nm to 50 nm, more preferably 2 nm to 30 nm, and still more preferably 4 nm to 20 nm.

When the value of Re (450)/Re (550) of the first optically anisotropic layer is greater than 0.5, the controllability of wavelength dispersibility may degrade when the first optically anisotropic layer and the second optically anisotropic layer are laminated.

The thickness of the first optically anisotropic layer is not particularly limited and may be suitably adjusted in accordance with the intended use. Preferably, however, it is 10 μm to 100 μm.

The first optically anisotropic layer is preferably a transparent polymer film. The light transmittance of the first optically anisotropic layer is preferably 80% or higher.

As a polymer constituting the polymer film, for example, cellulose esters (such as cellulose acetate, and cellulose diacetate) are exemplified.

Among the cellulose esters, cellulose lower fatty acid esters are more preferable. The term "lower fatty acid" means a fatty acid having carbon atoms of 6 or less.

In particular, cellulose acetate having carbon atoms of 2, cellulose propionate having carbon atoms of 3, or cellulose butylate having carbon atoms of 4 are preferable. Of these, the cellulose acetate having carbon atoms of 2 is particularly preferable.

Note that a mixed fatty acid ester such as cellulose acetate propionate, cellulose acetate butylate may also be used.

In order to adjust a retardation value of the polymer film within the preferred range, it is common to use a method of applying an external force such as stretching. Besides, a retardation increasing agent may be added to the polymer film so as to control the optical anisotropy.

The retardation increasing agent is not particularly limited and may be suitably selected in accordance with the intended use. However, an aromatic compound having at least aromatic rings is preferable. It is preferred to use the aromatic compound in an additive amount of 0.01 parts by mass to 20 parts by mass per 100 parts by mass of a polymer. A mixture of two or more aromatic compounds may also be used as the retardation increasing agent. Note that the aromatic rings of such an aromatic compound encompass aromatic hetero rings, in addition to aromatic hydrocarbon rings.

The retardation increasing agent is described, for example, in European Patent Application Laid-Open No. 0911656, and Japanese Patent Application Laid-Open (JP-A) Nos. 2000-111914 and 2000-275434.

The production method of the first optically anisotropic layer is not particularly limited and may be suitably selected in accordance with the intended use. For instance, when the first optically anisotropic layer is formed of a polyacetate film, it is possible to produce a first optically anisotropic layer in accordance with a conventionally known production method of polyacetate film while selecting a suitable retardation increasing agent, adjusting the additive amount of the retardation increasing agent as well as appropriately controlling the stretching direction of its form so as to obtain an intended retardation value.

(Second Optically Anisotropic Layer)

As described above, the second optically anisotropic layer satisfies the following Expression (2).

$$0.95 \leq Re(450)/Re(550) \leq 1.05 \quad \text{Expression (2)}$$

The value of Re (450) of the second optically anisotropic layer is preferably 30 nm to 90 nm, more preferably 40 nm to 80 nm, and still more preferably 50 nm to 70 nm.

The value of Re (550) of the second optically anisotropic layer is preferably 30 nm to 90 nm, more preferably 40 nm to 80 nm, and still more preferably 50 nm to 70 nm.

When the value of Re (450)/Re (550) of the second optically anisotropic layer is smaller than 0.95, the display properties of the resulting liquid crystal display device may degrade. When the value is greater than 1.05, the controllability of wavelength dispersibility may degrade when the first optically anisotropic layer and the second optically anisotropic layer are laminated.

The thickness of the second optically anisotropic layer is not particularly limited and may be suitably adjusted in accordance with the intended use. Preferably, however, it is 10 μm to 100 μm.

The second optically anisotropic layer is preferably a transparent polymer film. The light transmittance of the second optically anisotropic layer is preferably 80% or higher.

As a polymer constituting the polymer film, for example, cyclic olefin-based homopolymers and cyclic olefin-based copolymers are exemplified.

The cyclic olefin-based homopolymer can be obtained by polymerizing a monomer composed of cyclic olefin alone, such as norbornene.

The cyclic olefin-based copolymer can be obtained by copolymerizing a monomer composed of cyclic olefin such as norbornene together with a monomer having a vinyl group, for example, a non-cyclic polyolefin-based monomer such as propylene, and an acrylic-based monomer such as methyl methacrylate and methyl acrylate.

Similarly to the first optically anisotropic layer, in order to adjust a retardation value of the polymer film of the second optically anisotropic layer within the preferred range, the second optically anisotropic layer may be stretched, or the retardation increasing agent may be added thereto.

As described in International Publication No. WO 00/26705, even a polymer that is likely to exhibit birefringence, like polycarbonate or polysulfone that have been conventionally known, the birefringence expression can be controlled by modifying molecules thereof, and so the polymer can be used in the first optically anisotropic layer or the second optically anisotropic layer as long as the polymer has a function of the first optically anisotropic layer or a function of the second optically anisotropic layer.

The first optically anisotropic layer and the second optically anisotropic layer are laminated so that a slow axis of the first optically anisotropic layer and a slow axis of the second optically anisotropic layer are parallel to each other.

The first optically anisotropic layer and the second optically anisotropic layer are bonded to each other using an adhesive. Examples of the adhesive include acrylic-based, vinyl-alcohol-based, silicone-based, polyester-based, polyurethane-based, polyether-based polymer adhesives, isocyanate-based adhesives, and rubber-based adhesives.

In the present invention, an optical film which is provided with the first optically anisotropic layer and the second optically anisotropic layer and which does not have an optically anisotropic layer (explained below) containing a liquid crystal compound may be referred to as a support.

(Optically Anisotropic Layer Containing Liquid Crystal Compound)

The optical film may be further provided with an optically anisotropic layer containing a liquid crystal compound, the optically anisotropic layer otherwise referred to as "liquid crystal optically anisotropic layer".

The liquid crystal optically anisotropic layer is preferably designed so as to compensate for a liquid crystal compound in a liquid crystal cell in black display by a liquid crystal display device. The alignment state of the liquid crystal compound in a liquid crystal cell in black display changes depending on the mode of the liquid crystal display device. The alignment state of a liquid crystal compound in a liquid crystal cell is described on pp. 411 to 414 in IDW'00, FMC7-2.

The liquid crystal optically anisotropic layer may be directly formed on the optical film as a support or may be formed over the support via an alignment film.

The liquid crystal optically anisotropic layer is composed of a composition containing a liquid crystal compound and the like.

The alignment film is not particularly limited and may be suitably selected in accordance with the intended use. When a rubbing treatment is applied to the alignment film, the alignment direction of the liquid crystal compound in the liquid crystal optically anisotropic layer can be determined by suitably set a rubbing treatment direction.

When the alignment layer is formed, a saponification treatment may be suitably applied to the first optically anisotropic layer or second optically anisotropic layer in the optical film.

The thickness of the alignment film is not particularly limited and may be suitably selected in accordance with the intended use. Preferably, however, it is 10 μm or less.

The liquid crystal compound contained in the liquid crystal optically anisotropic layer is not particularly limited and may be suitably selected in accordance with the intended use. For example, a rod-shaped liquid crystal compound, and a discotic liquid crystal compound are preferably used.

(Rod-Shaped Liquid Crystal Compound)

Examples of the rod-shaped liquid crystal compound include azomethines, azoxys, cyanobiphenyls, cyanophenyl esters, benzoic esters, phenyl esters of cyclohexane-carboxylates, cyanophenylcyclohexanes, cyano-substituted phenylpyrimidines, alkoxy-substituted phenylpyrimidines, phenyldioxanes, tolanes, and alkenylcyclohexylbenzonitriles.

Metal complexes are also included in the rod-like liquid crystal compounds. Further, a liquid crystal polymer in which the repeating unit contains a rod-like liquid crystal constituent is also usable as the rod-like liquid crystal compound. In other words, the rod-like liquid crystal compound may be combined with a (liquid crystal) polymer.

Descriptions of the rod-like liquid crystal compounds are found in "*Kagaku-Sosetsu, Ekisho no Kagaku* (Chemistry of Liquid Crystal)," edited by Chemical Society of Japan, vol. 22 (1994), Chapters 4, 7 and 11; and "*Ekisho Devise Handbook* (Liquid Crystal Device Handbook), Chapter 3, complied by Nippon Gakujutsu Shinko Kai, Committee No. 142.

The birefringence index of the rod-shaped liquid crystal compound is preferably within the range of from 0.001 to 0.7.

The rod-shaped liquid crystal compound preferably has a polymerizable group for the sake of fixing its alignment state. As for the polymerizable group, an unsaturated polymerizable group or an epoxy groups is preferable. More preferred is an unsaturated polymerizable group. Particularly preferred is an ethylenically unsaturated polymerizable group.

(Discotic Liquid Crystal Compound)

Specific examples of the discotic liquid crystal compound include benzene derivatives described in a study report by C. Destrade, et. al., (Mol. Cryst. Vol. 71, page 111 (1981)); torxene derivatives described in a study report by C. Destrade, et. al., (Mol. Cryst. Vol. 122, page 141 (1985)), and Physics lett, A, Vol. 78, page 82 (1990)); cyclohexane derivatives described in B. Kohne et. al., (Angew. Chem. Vol. 96, page 70 (1984)); and azacrown-based or phenylacetylene-based macrocycles described in a study report by J. M. Lehn et. al. (J.C.S., Chem. Commun., page 1794 (1985)), and a study report by J. Zhand et. al, (J. Am. Chem. Soc., Vol. 116. page 2655 (1994)).

Examples of the discotic liquid crystal compound further include compounds which have such a structure that straight chain alkyl groups or alkoxy groups, substituted benzoyloxy groups, etc. are radially substituted as side chains of the center mother nucleus (core portion) of the molecule. Preferred is a compound of which the molecule or aggregate of molecules has rotational symmetry and is capable of providing a constant alignment.

In an optically anisotropic layer formed of a discotic liquid crystal compound, a compound finally contained in the optical anisotropic layer is not necessarily a discotic liquid crystal compound. For example, the compound encompasses a compound with a low-molecular weight discotic liquid crystal molecule that has a group capable of reacting by heat or light, the compound being polymerized or crosslinked by a reaction under application of heat or light, and highly polymerized, resulting in the loss of liquid crystallinity. Preferred examples of a discotic liquid crystal compound include those described in Japanese Patent Application Laid-Open (JP-A) No. 8-50206. The descriptions of polymerization of a discotic liquid crystal compound are described in Japanese Patent Application Laid-Open (JP-A) No. 8-27284.

In order for a discotic liquid crystal compound to be fixed by polymerization, it is necessary to bond a polymerizable group as a substituent to a discotic core of the discotic liquid crystal compound. However, when a polymerizable group is directly bonded to the discotic core, it becomes difficult to maintain an alignment state in a polymerization reaction. Therefore, a linking group is introduced between the discotic core and the polymerizable group. Accordingly, the discotic liquid crystal compound having a polymerizable group is preferably a compound expressed by the following General Formula (1).

General Formula (1)

In the above General Formula (1), D represents a discotic core, L represents a divalent linking group, Q represents a polymerizable group, and n represents an integer of 4 to 12.

The following are examples (D1) to (D15) of the discotic core (D). In the following examples, LQ (or QL) is a combination of a divalent linking group (L) and a polymerizable group (Q).

(D1)

(D2)

(D3)

(D4)

(D5)

(D13)

(D14)

(D15)

In the above General Formula (1), the divalent linking group (L) is preferably a divalent linking group selected from a group consisting of an alkylene group, an alkenylene group, an arylene group, —CO—, —NH—, —O—, —S—, and combinations thereof.

The divalent linking group (L) is more preferably a divalent linking group of a combination of at least two divalent groups selected from a group consisting of an alkylene group, an arylene group, —CO—, —NH—, —O—, and —S—.

The divalent linking group (L) is particularly preferably a divalent linking group of a combination of at least two divalent groups selected from a group consisting of an alkylene group, an arylene group, —CO—, and —O—.

The number of carbon atoms of the alkylene group is preferably 1 to 12. The member of carbon atoms of the alkenylene group is preferably 2 to 12. The number of carbon atoms of the arylene group is preferably 6 to 10.

The following are examples (L1 to L25) of the divalent linking group (L). The left hand side of the divalent linking group is linked to a discotic core (D), and the right hand side thereof is linked to a polymerizable group (Q). AL represents an alkylene group or an alkenylene group; and AR represents an arylene group. Note that the alkylene group, alkenylene group, and arylene group may have a substituent (e.g. alkyl group).

L1: -AL-CO—O-AL-
L2: -AL-CO—O-AL-O—
L3: -AL-CO—O-AL-O-AL-
L4: -AL-CO—O-AL-O—CO—
L5: —CO-AR—O-AL-
L6: —CO-AR—O-AL-O—
L7: —CO-AR—O-AL-O—CO—
L8: —CO—NH-AL-
L9: —NH-AL-O—
L10: —NH-AL-O—CO—
L11: —O-AL-
L12: —O-AL-O—
L13: —O-AL-O—CO—
L14: —O-AL-O—CO—NH-AL-
L15: —O-AL-S-AL-
L16: —O—CO-AL-AR—O-AL-O—CO—
L17: —O—CO-AR—O-AL-CO—
L18: —O—CO-AR—O-AL-O—CO—
L19: —O—CO-AR—O-AL-O-AL-O—CO—
L20: —O—CO-AR—O-AL-O-AL-O-AL-O—CO—
L21: —S-AL-
L22: —S-AL-O—
L23: —S-AL-O—CO—
L24: —S-AL-S-AL-
L25: —S-AR-AL-

In the above General Formula (1), the polymerizable group (Q) is determined by the type of polymerization reaction. Examples of the polymerization group (Q) are shown below.

$$—CH=CH_2 \quad (Q1)$$

$$—C\equiv CH \quad (Q2)$$

$$—CH_2—C\equiv CH \quad (Q3)$$

$$—NH_2 \quad (Q4)$$

$$—SO_3H \quad (Q5)$$

$$—CH_2—\overset{O}{\overset{\diagup \diagdown}{CH}}—CH_2 \quad (Q6)$$

$$—\underset{CH_3}{\overset{\displaystyle C=CH_2}{|}} \quad (Q7)$$

$$—CH=CH—CH_3 \quad (Q8)$$

$$—N=C=S \quad (Q9)$$

$$—SH \quad (Q10)$$

$$—CHO \quad (Q11)$$

$$—OH \quad (Q12)$$

$$—CO_2H \quad (Q13)$$

$$—N=C=O \quad (Q14)$$

$$—CH=CH—C_2H_5 \quad (Q15)$$

-continued (Q16)

(Q17)

(Q18)

The polymerizable group (Q) is preferably an unsaturated polymerizable group (Q1, Q2, Q3, Q7, Q8, Q15, Q16, or Q17) or an epoxy group (Q6 or Q18), more preferably an unsaturated polymerizable group, and particularly preferably an ethylenically unsaturated polymerizable group (Q1, Q7, Q8, Q15, Q16, or Q17).

In the above General Formula (1), "n" is an integer of 4 to 12. A specific value of "n" is determined by the type of the discotic core (D). Note that in a combination of a plurality of Ls (divalent linking groups) and a plurality of Qs (polymerizable groups), the types of the divalent linking groups selected may be different from each other, but is preferably identical to each other, and the types of the polymerizable groups may be different from each other, but is preferably identical to each other.

In hybrid alignment, the angle between the long axis (disc plane) of the discotic liquid crystalline molecules and the plane of the support (optical film) increases or decreases, with increase in the distance from the plane of the polarizing film in the depth direction of the optically anisotropic layer, i.e., in a direction substantially perpendicular to the support (optical film). Preferably, the angle decreases with increase in the distance. The possible changes in angle include: continuous increase, continuous decrease, intermittent increase, intermittent decrease, change including both continuous increase and continuous decrease, and intermittent change including increase and decrease. The intermittent changes include the area midway across the thickness where the tilt angle does not change. Even if the change includes the area where the angle does not change, it does not matter as long as the angle increases or decreases as a whole. Preferably, the angle changes continuously.

The average direction of the long axis (disc plane) of the discotic liquid crystal compound (average long axis direction of molecules) can be, in general, controlled by selecting a material for discotic liquid crystal compound or alignment film, or by selecting a rubbing treatment method.

The direction of the long axis (disc plane) on the surface side (air-contact side) of the discotic liquid crystal compound can be, in general, controlled by selecting the type of discotic liquid crystal compound or the type of additives to be used together with the discotic liquid crystal compound.

Examples of the additives to be used together with a discotic liquid crystal compound include plasticizers, surfactants, polymerizable monomers, and copolymers. Similarly to the above, the degree of change in alignment direction of the long axis can also be controlled by selecting a liquid crystal molecules and additives.

Preferably, the plasticizer, surfactant and polymerizable monomer used in combination with the discotic liquid crystal compound preferably have compatibility with the discotic liquid crystal compound and can give variation in tilt angle of the discotic liquid crystal compound or do not hinder alignment. As for the polymerizable monomer, compounds having vinyl groups, vinyloxy groups, acryloyl groups, and methacryloyl groups are preferred.

In addition, generally, the amount of addition of the above-mentioned compound is preferably 1% by mass to 50% by mass, and more preferably 5% by mass to 30% by mass relative to the amount of the liquid crystal compound. Use of polymerizable monomers having 4 or more polymerization-reactive functional groups by mixture can improve adhesion between the alignment and the optically anisotropic layer.

The liquid crystal optically anisotropic layer may contain a polymer in addition to the discotic liquid crystal compound. It is preferable to use a polymer having a certain degree of compatibility with the discotic liquid crystal compound and which can give variation in tilt angle to the discotic liquid crystal compound.

Examples of the polymer include cellulose ester.

Preferred examples of the cellulose ester include cellulose acetate, cellulose acetate propionate, hydroxypropyl cellulose, and cellulose acetate butyrate.

When the amount of addition of cellulose ester, in particular, cellulose acetate butyrate is large, formation of domain is promoted. Therefore, in order not to hinder alignment of the discotic liquid crystal compound, the amount of addition of the above-mentioned polymer is preferably 0.1% by mass to 2.0% by mass, more preferably 0.1% by mass to 1.5% by mass, and still more preferably 0.1% by mass to 1.0% by mass, relative to the discotic liquid crystal compound.

The phase transition temperature from a discotic nematic liquid crystal phase to a solid phase of the discotic liquid crystal compound is preferably 70° C. to 300° C., and more preferably 70° C. to 170° C.

As the above-mentioned polymer, a fluorine-based polymer or the like may be added in an appropriate amount.

(Fixation of Alignment State of Liquid Crystal Molecules)

Aligned liquid crystal molecules can be fixed with its alignment state kept. The fixation is preferably carried out by a polymerization reaction. The polymerization reaction includes a thermal polymerization reaction using a thermal polymerization initiator and a photopolymerization reaction using a photopolymerization initiator. Of these, a photopolymerization reaction is preferred.

Examples of the photopolymerization initiator include α-carbonyl compounds (described in U.S. Pat. Nos. 2,367,661, and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127, and 2,951,758), combinations of triarylimidazole dimer and p-aminophenyl ketone (described in U.S. Pat. No. 3,549,367), acridine and phenazine compounds (described in Japanese Patent Application Laid-Open (JP-A) No. 60-105667, and U.S. Pat. No. 4,239,850), and oxadiazole compounds (described in U.S. Pat. No. 4,212,970).

The amount of photopolymerization initiator used is preferably in the range of from 0.01% by mass to 20% by mass, and more preferably in the range of from 0.5% by mass to 5% by mass, relative to the solid content of the coating liquid.

In irradiation of light for polymerization of liquid crystal molecules, it is preferably to use ultraviolet ray.

The energy of irradiation is preferably in the range of 20 mJ/cm$^2$ to 50 J/cm$^2$, more preferably in the range of 20 mJ/cm$^2$ to 5,000 mJ/cm$^2$, and still more preferably in the range of 100 mJ/cm$^2$ to 800 mJ/cm$^2$. In order to promote the photopolymerization reaction, light irradiation may be carried out under application of heat.

(Other Layers)

In addition to the first optically anisotropic layer, the second optically anisotropic layer and the liquid crystal optically anisotropic layer, other optically anisotropic layers, a protective layer may be vertically stacked over the optical film unless these layers impair the effects of the present invention.

[Polarizing Plate]

The polarizing plate of the present invention is provided with at least the above-mentioned optical film and a polarizer, and may be further provided with a protective layer (protective film).

The polarizing plate is provided with at least the first optically anisotropic layer and the second optically anisotropic layer, may be provided with an optical film having no liquid crystal optically anisotropic layer, or may be provided with an optical film (multilayered optical film) in which a liquid crystal optically anisotropic layer is further stacked over the first optically anisotropic layer and the second optically anisotropic layer.

(Polarizer)

The polarizer is formed of a polarizing film.

As the polarizer, a coating-type polarizing film typified by a polarizing film produced by Optiva Co. or a polarizer composed of a binder and iodine or dichromatic pigment is preferable.

In a polarizing film, iodine and a dichromatic pigment are aligned in a binder to thereby exhibit their polarization performance. It is preferable that iodine and a dichromatic pigment be unidirectionally oriented along with binder molecules, or the dichromatic pigment be unidirectionally oriented by its self-organization, like liquid crystal.

A general-purpose polarizer can be produced by, for example, dipping in a bath a stretched polymer in a solution of iodine or dichromatic pigment so as to saturate the iodine in the binder or to saturate the dichromatic pigment in the binder.

In a general-purpose polarizing film, iodine or dichromatic pigment is distributed in a depth of about 4 μm from a polymer surface (about 8 μm in all on both sides). In order to obtain sufficient polarization performance, it is necessary to form a polarizing film of at least 10 μm in thickness. The degree of penetration of iodine or dichromatic pigment can be controlled by the concentration of an iodine solution or dichromatic pigment solution, the temperature of the bath therefore, and the dipping time therefore.

As described above, the minimum thickness of the binder is preferably 10 μm. The maximum thickness thereof is not particularly limited. From the perspective of light leak phenomenon brought about when the polarizing plate is used in a liquid crystal display device, the thinner the polarizing plate is the better. Presently, the thickness of a general-purpose polarizing plate is typically about 30 μm or less, more preferably 25 μm or less, and still more preferably 20 μm or less. When the thickness of a polarizing plate is 20 μm or less, no light leak phenomenon will be observed in a 17-inch liquid crystal display device.

The binder used in the polarizing film may be crosslinked. For the binder for the polarizing film, usable is a polymer that is crosslinkable by itself. A polymer having a functional group or a binder that can be obtained by introducing a functional group to a polymer is reacted between binder molecules by the effect of light, heat or a pH change, thereby a polarizing film can be formed.

Also, a crosslinking structure may be introduced to a polymer by using a crosslinking agent. Further, a combined group derived from a crosslinking agent is introduced between binder molecules using a crosslinking agent, which is a compound having high-reactivity, so as to crosslink binder molecules, thereby a polarizing film can be formed.

Generally, the treatment for crosslinking can be carried out by applying a coating liquid containing a polymer or a mixture of a polymer and a crosslinking agent onto a transparent support, and heating the applied coating liquid. It is only necessary to ensure the durability of a final product, and thus the treatment for crosslinking may be performed at any stage until a final polarizing plate is obtained.

For the binder used for the polarizing film, both a polymer that is crosslinkable by itself and a polymer crosslinked by a crosslinking agent can be used. Examples of such a polymer include polymethyl methacrylates, polyacrylic acids, polymethacrylic acids, polystyrenes, gelatins, polyvinyl alcohols, modified polyvinyl alcohols, poly(N-methylol acrylamides), polyvinyl toluenes, chlorosulfonated polyethylenes, nitrocelluloses, chlorinated polyolefins (e.g. polyvinyl chloride), polyesters, polyimides, polyvinyl acetates, polyethylenes, carboxymethylcelluloses, polypropylenes, and polycarbonates or copolymers thereof (e.g. acrylic acid/methacrylic acid polymer, styrene/maleic imide polymer, styrene/vinyl toluene polymer, vinyl acetate/vinyl chloride polymer, ethylene/vinyl acetate polymer). Among these polymers, water-soluble polymers (e.g. poly(N-methylol acrylamide), carboxymethylcelluloses, gelatins, polyvinyl alcohols, and modified polyvinyl alcohols) are preferable; gelatins, polyvinyl alcohols, and modified polyvinyl alcohols are still more preferable; and particularly preferred are polyvinyl alcohols, and modified polyvinyl alcohols.

The saponification degree of a polyvinyl alcohol or modified polyvinyl alcohol is preferably 70% to 100%, still more preferably 80% to 100%, and particularly preferably 95% to 100%. The polymerization degree of the polyvinyl alcohol is preferably 100 to 5,000. A modified polyvinyl alcohol can be obtained by introducing a modifying group into polyvinyl alcohol by the effects of copolymer modification, chain transfer modification, or block polymerization modification.

In the copolymer modification, as a modifying group, —COONa, —Si(OH)$_3$, N(CH$_3$)$_3$·Cl, C$_9$H$_{19}$COO—, —SO$_3$Na, and —C$_{12}$H$_{25}$ can be introduced into polyvinyl alcohol.

In the chain transfer modification, as a modifying group, —COONa, —SH, and —SC$_{12}$H$_{25}$ can be introduced into polyvinyl alcohol.

The polymerization degree of the modified polyvinyl alcohol is preferably 100 to 3,000. Descriptions of the modified polyvinyl alcohol are found in Japanese Patent Application Laid-Open (JP-A) Nos. 8-338913, 9-152509, and 9-316127.

As a binder for the polarizing film, an unmodified polyvinyl alcohol and an alkylthio-modified polyvinyl alcohol each having a saponification degree of 85% to 95% are particularly preferable.

Two or more polyvinyl alcohols and modified polyvinyl alcohols may be used in combination.

An addition of a crosslinking agent in a large amount into the binder makes it possible to improve the resistance to moist heat of the polarizing film. However, when a crosslinking agent in an amount of 50% by mass or more is added to the binder, the orientation properties of the iodide or dichromatic pigment degrade. The amount of the crosslinking agent added to the binder is preferably 0.1% by mass to 20% by mass, and still more preferably 0.5% by mass to 15% by mass.

Even after the completion of crosslinking reaction, the binder contains a certain amount of unreacted crosslinking agent. The amount of the unreacted crosslinking agent remaining in the binder is preferably 1.0% by mass or less, and still more preferably 0.5% by mass or less. When more than 1.0% by mass of the unreacted crosslinking agent is contained in the formed binder layer, the durability of the resultant polarizing film may sometimes degrade. In other words, when a polarizing film containing a large amount of residual crosslinking agent is incorporated in a liquid crystal display device, and the liquid crystal display device is used in a long period of time or is left intact for a long term under high-temperature/high humidity atmospheric conditions, the polarization degree may decrease.

Descriptions of the crosslinking agent are found in U.S. Pat. No. 23,297. A boron compound (e.g. boron, and borax) can also be used as a crosslinking agent.

As a dichromatic pigment, an azo pigment, stilbene pigment, pyrazolone pigment, triphenylmethane pigment, quinoline pigment, oxazine pigment, thiazine pigment or anthraquinone pigment is used. Preferably, the dichromatic pigment is water-soluble and has a hydrophilic group (e.g. a sulfo group, amino group, and hydroxyl group).

Examples of the dichromatic pigment include C.I. Direct Yellow 12, C.I. Direct Orange 39, C.I. Direct Orange72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59, and C.I. Acid Red 37.

Descriptions of the dichromatic pigment are found in Japanese Patent Application Laid-Open (JP-A) Nos. 1-161202, 1-172906, 1-172907, 1-183602, 1-248105, 1-265205, and 7-261024. The dichromatic pigment is used as a free acid or alkali metal salt, or an ammonium salt or amine salt. Use of a combination of two or more dichromatic pigments makes it possible to produce a polarizing plate having various hues.

When polarization axes are made orthogonal to each other, a polarizing film using a compound (pigment) that forms a black color, or a polarizing film or polarizing plate obtained by using a combination of various dichromatic pigments so as to form a black color are preferred because they become superior in both single-plate transmittance and polarization degree.

In order to increase the contrast ratio of a liquid crystal display device, the polarizing plate preferably has a higher transmittance as well as a higher polymerization degree.

The transmittance of the polarizing plate to light having a wavelength of 550 nm is preferably in the range of 30% to 50%, still more preferably in the range of 35% to 50%, and particularly preferably in the range of 40% to 50%, i.e., the polarizing plate has a maximum single plate transmittance of 50%.

The polarization degree of the polarizing plate to light having a wavelength of 550 nm is preferably in the range of 90% to 100%, still more preferably in the range of 95% to 100%, and particularly preferably in the range of 99% to 100%.

It is also possible to dispose a polarizing film and an optically anisotropic layer or a polarizing film and an alignment film via an adhesive. As the adhesive, a polyvinyl alcohol resin (including a modified polyvinyl alcohol obtained through modification using a acetoacetyl group, sulfonic acid group, carboxyl group and/or oxyalkylene group), and an aqueous solution containing a boron compound can be used. Of these, a polyvinyl alcohol resin is preferable. The thickness of the adhesive layer after being dried is preferably in the range of 0.01 μm to 10 μm, and more preferably in the range of 0.05 μm to 5 μm.

(Production of Polarizer)

From the perspective of yield of polarizing film, it is preferred that the binder be stretched obliquely at an angle of 10 degrees to 80 degrees with respect to a longitudinal direction (MD direction) of the polarizing film (stretching method), or be subjected to a rubbing treatment and then died with iodine or a dichromatic pigment. The binder is preferably stretched so that the tilt angle is set in proximity to an angle formed between a transmission axis of two polarizing plates laminated at both surfaces of a liquid crystal cell constituting LCD and the longitudinal or lateral direction of the liquid crystal cell.

Usually, the tilt angle is 45 degrees. Recently, however, transmission type, reflection type and semi-transmission liquid crystal devices (LCDs) having polarizing films whose tilt angle is not necessarily set to 45 degrees have been developed, and the stretching direction is preferably arbitrarily controlled in accordance with the design of the LCD.

When the stretching method is employed, the draw ratio is preferably 2.5 times to 30.0 times, and more preferably 3.0 times to 10.0 times. The polarizing film can be dry-stretched in the air. The binder can also be wet-stretched in the state of being dipped in water. The draw ratio in the dry stretching is preferably 2.5 times to 5.0 times, and the draw ratio in the wet stretching is preferably 3.0 times to 10.0 times.

Stretching treatment can be performed several times, including oblique stretching. By repetitively subjecting the binder to stretching treatment several times, the resultant binder film can be more uniformly stretched even at high-draw ratio. The unstretched binder film (binder) may be slightly stretched laterally or longitudinally (to an extent of preventing shrinkage of the resultant binder film in its width direction) before obliquely stretched.

The unstretched binder film (binder) can be stretched by biaxial tenter stretching in different steps between right and left of the unstretched binder film. The biaxial tenter stretching is performed in a similar manner to those used in common film formation.

Since in the biaxial stretching, the binder is stretched at different speeds between right and left, it is necessary for the unstretched binder film to have a different thickness between right and left sides thereof. In flow casting film formation, it possible to provide a variation in flow rate of a binder solution between the right and left sides by providing a taper to a die.

In accordance with the above-noted manner, a binder film stretched obliquely at an angle of 10 degrees to 80 degrees with respect to the MD direction of the polarizing film can be produced.

For the rubbing treatment, a rubbing treatment widely used as a liquid crystal alignment treatment of LCD is adaptable. More specifically, the surface of the binder film is rubbed with paper, gauze, felt, rubber, a nylon fiber or polyester fiber, in a fixed direction to thereby obtain an alignment.

Generally, the binder is rubbed several times using a fabric made by evenly planting a fiber with uniformity in length and thickness. On this occasion, it is preferable to rub the binder with a rubbing roll of 30 μm or less in all the circularity of the roll itself, cylindricity thereof, and eccentricity thereof. The wrap angle of the film to the rubbing roll is preferably from 0.1 degrees to 90 degrees. However, as disclosed in JP-A-8-160430, a stable rubbing treatment may also be achieved by winding the film at an angle of 360 degrees or more.

In the case of rubbing a lengthy film, the film is preferably conveyed by a conveying device at a speed of 1 m/min to 100 m/min under a fixed tension. The rubbing roll is preferably set rotatably in the horizontal direction with respect to the film-traveling direction, so that an arbitrary rubbing angle can be selected. An appropriate rubbing angle is preferably selected in the range from 0 degrees to 60 degrees. When the resultant polarizer is used in a liquid crystal display device, the rubbing angle is preferably 40 degrees to 50 degrees, and particularly preferably 45 degrees.

On the surface opposite the optically anisotropic layer of the polarizing film, a polymer film is preferably disposed (arrangement of optically anisotropic layer/polarizing film/polymer film).

[Liquid Crystal Display Device]

The optical film and the polarizing plate of the present invention can be used in various modes of liquid crystal display device. In particular, they are preferably used in TN mode liquid crystal display devices where black display is difficult to attain without an optical film being attached.

The liquid crystal display device is provided with at least a liquid crystal cell and two sheets of polarizing plates disposed at both sides of the liquid cell. The liquid crystal cell carries a liquid crystal in between two electrode substrates.

The liquid crystal display device encompasses, besides TN mode liquid crystal display devices, OCB mode liquid crystal display devices, VA mode liquid crystal device, ECB mode liquid crystal display devices, and STN mode liquid crystal display devices.

EXAMPLES

Hereinbelow, the present invention will be further described in detail with reference to specific Examples, however, the present invention is not limited to the disclosed Examples. On the contrary, the present invention is intended to cover various modifications and equivalent arrangements of the materials, amount of use thereof, composition ratio, treatments, treatment procedures and the like described below, included within the spirit and scope of the appended claims.

Example 1

(Production of Cellulose Acetate)

The following composition was charged into a mixing tank, and stirred while heating so as to dissolve the constituents, thereby preparing a cellulose acetate solution.

| | |
|---|---|
| cellulose acetate having an acetylation degree of 60.7% to 61.1% | 100 parts by mass |
| triphenyl phosphate (plasticizer) | 7.8 parts by mass |
| biphenyldiphenyl phosphate (plasticizer) | 3.9 parts by mass |
| methylene chloride (first solvent) | 336 parts by mass |
| methanol (second solvent) | 29 parts by mass |
| 1-butanol (third solvent) | 11 parts by mass |

In another mixing tank, 16 parts by mass of a retardation increasing agent represented by the following structural formula, 92 parts by mass of methylene chloride, and 8 parts by mass of methanol were charged, and the constituents were stirred while heating to thereby prepare a retardation increasing agent solution. Ten (10) parts by mass of the obtained retardation increasing agent solution were mixed with 487.7 parts by mass of the cellulose acetate solution, and sufficiently stirred to prepare a dope.

Retardation Increasing Agent

The obtained dope was flow-cast on a band stretching machine. After confirmation that the film surface temperature became 40° C., the film was dried by hot air of 70° C. for 1 minute. The film was separated from the band, dried by dry air of 140° C. for 10 minutes, further clipped by tenter clips and then laterally stretched to thereby prepare a cellulose acetate film containing 0.3% by mass of residual solvent (thickness: 60 μm, a first optically anisotropic layer). The Re retardation value and Rth retardation value at a wavelength of 550 nm of the prepared cellulose acetate film were measured using a KOBRA 21 ADH (manufactured by Ohji Keisoku Kiki Co.). The cellulose acetate film was found to have a slow axis orthogonal to the conveying direction, an Re value (550) of 20 nm, and an Rth value (550) of 30 nm. Also, it was found that the cellulose acetate film had an Re value (450) of 8 nm, which was measured at a wavelength of 450 nm. Thus, the value Re (450)/Re (550) was 0.4.

(Preparation of Dope of Ring-Opening Polymerization Cyclic Polyolefin)

The following composition was charged into a mixing tank, and stirred so as to dissolve the constituents, and then filtered through a filter paper having an average pore diameter of 34 μm and a sintered metal filter having an average pore diameter of 10 μm.

| Cyclic polyolefin solution A | |
|---|---|
| ARTON G (produced by JSR Corporation) | 150 parts by mass |
| methylene chloride | 550 parts by mass |
| ethanol | 50 parts by mass |

Next, the following composition containing the ring-opening polymerization cyclic polyolefin solution prepared by the above-mentioned method was charged to a dispersing machine to prepare a matting agent dispersion liquid.

| Matting agent dispersion liquid | |
|---|---|
| silica particles having an average particle diameter of 16 nm (AEROSIL R972 produced by Nippon Aerosil Co., Ltd.) | 2 parts by mass |
| methylene chloride | 75 parts by mass |
| ethanol | 5 parts by mass |
| cyclic polyolefin solution A | 10 parts by mass |

One-hundred (100) parts by mass of the cyclic polyolefin solution were mixed with 1.1 parts by mass of the matting agent dispersion liquid to prepare a film-formation dope.

(Production of Cyclic Polyolefin Film)

The above-noted dope was flow cast by a band-flow casting machine. The formed film was separated from the band when the amount of residual solvent was approximately 22% by mass. Subsequently, the film was held by tenter clips and then laterally stretched in a conveyance zone, and then dried at 130° C. and wound up. The formed cyclic polyolefin film was found to have a thickness of 48 μm. The film was then subjected to a glow discharge treatment in between upper and lower brass-made electrodes (under argon gas atmosphere). In the glow discharge treatment, a high-frequency voltage of 3,000 Hz and 4,200 V was applied to the upper and lower brass-made electrodes, and the film was glow discharged for 20 seconds to thereby produce a ring-opening polymerization cyclic polyolefin film. The contact angle of the film surface with respect to pure water was in the range of from 38° to 42°. The contact angle was measured by a contact angle meter, model CA-X manufactured by Kyowa Interface Science Co., LTD. The slow axis of the cyclic polyolefin film was measured by a KOBRA 21 ADH (manufactured by Ohji Keisoku Kiki Co.) and found to be orthogonal to the conveying direction. The ring-opening polymerization cyclic polyolefin film was found to have an Re value (550) of 60 nm, and an Rth value (550) of 30 nm. Also, it was found that the film had an Re value (450) of 61.8 nm, which was measured at a wavelength of 450 nm. Thus, the value Re (450)/Re (550) was 1.03.

(Saponification Treatment)

The produced cellulose acetate film was dipped in a 2.0N potassium hydroxide solution of 25° C. for 2 minutes and then neutralized with sulfuric acid, washed with pure water, followed by drying. The surface energy of the film was measured by a contact angle method and found to be 62 mN/m.

(Production of Alignment Film)

Over the cellulose acetate film, a coating liquid having the following composition was applied in an amount of 24 mL/m$^2$ by a wire bar coater #14, and dried by hot air of 100° C. for 120 seconds. Next, the formed film was subjected to a rubbing treatment in a longitudinal direction of the cellulose acetate film (at an angle of 0 degrees with respect to the longitudinal direction).

| (Composition of alignment film coating liquid) | |
|---|---|
| modified polyvinyl alcohol represented by the following structural formula | 40 parts by mass |
| water | 728 parts by mass |
| methanol | 228 parts by mass |
| glutaraldehyde (crosslinker) | 2 parts by mass |
| citric ester (AS3, produced by Sankyo Chemical Industries Ltd.) | 0.69 parts by mass | x = 86 y = 1.67 z = 12

(Production of Liquid Crystal Compound Layer (Liquid Crystal Optically Anisotropic Layer))

A coating liquid having the following composition was continuously applied over a surface of the alignment film in the roll film which was being conveyed at a speed of 28 m/min, while rotating a #3.0 wire bar coater at 1,093 rpm in the same direction as the film conveying direction. In the step of continuously heating the applied coating liquid from ambient room temperature to 100° C., the solvents were dried, and the film was heated in a dry zone of 125° C. for about 120 seconds to thereby make the liquid crystal compound oriented (aligned). Subsequently, the aligned liquid crystal compound film was conveyed to a dry zone of 95° C. in ultraviolet ray irradiation equipment (ultraviolet lamp: irradiation output 160 W/cm, emitting light length: 1.6 m) and irradiated with ultraviolet ray of illumination intensity of 600 mW for 4 seconds so as to proceed a crosslinking reaction, thereby fixing the alignment of the liquid crystal compound. Thereafter, the aligned product was stood to cooling to ambient room temperature and wound up in a cylindrical form, thereby obtaining an optical film in the form of a roll.

| (Composition of liquid crystal compound layer coating liquid) | |
|---|---|
| discotic liquid crystal compound represented by the following structural formula | 41.01 parts by mass |
| ethylene oxide-modified trimethylolpropane triacrylate (V#360, produced by Osaka Organic Chemical Industry Ltd.) | 4.06 parts by mass |
| cellulose acetate butylate (CAB531-1, produced by Eastman Chemical Co.) | 0.35 parts by mass |
| photopolymerization initiator (IRGACURE 907, produced by Ciba Geigy Inc.) | 1.35 parts by mass |
| sensitizer (KAYACURE DETX, produced by NIPPON KAYAKU CO., LTD.) | 0.45 parts by mass |
| fluoro-aliphatic group-containing copolymer (MEGAFAC F780, produced by Dainippon Ink Chemical Industries Co., Ltd.) | 0.10 parts by mass |
| methylethylketone | 102.00 parts by mass |

(Lamination of Optical Film)

The cellulose acetate film with the liquid crystal compound layer formed on a surface thereof was vertically stacked over the cyclic polyolefin film via an adhesive SK-1478 (produced by Soken Chemical & Engineering Co., Ltd.) so that the cellulose acetate film surface side faced to the cyclic polyolefin film, thereby obtaining a multilayered optical film in which the liquid crystal compound layer, cellulose acetate film and cyclic polyolefin film were laid in this order.

(Properties of Multilayered Optical Film)

Separately to the above, the cellulose acetate film that had not yet been provided with a liquid crystal compound layer was vertically stacked over the cyclic polyolefin film via an adhesive SK-1478 (produced by Soken Chemical & Engineering Co., Ltd.) so that their slow axes were parallel to each other. The Re value (550) and Re value (450) of the optical film were measured using a KOBRA 21 ADH (manufactured by Ohji Keisoku Kiki Co.). It was found that the optical film had an Re value (550) of 80 nm and an Re value (450) of 69.8 nm. Thus, the value Re (450)/Re (550) was 0.87.

(Production of Polarizing Plate)

A polyvinyl alcohol (PVA) film of 80 μm in thickness was dipped in an iodine aqueous solution having iodine concentration of 0.05% by mass at 30° C. for 60 seconds so as to be dyed, and then the film was dipped in a boron aqueous solution having a boron concentration of 4% by mass for 60 seconds so as to be longitudinally stretched 5 times the original length, followed by drying at 50° C. for 4 minutes, thereby obtaining a polarizing film of 20 μm in thickness.

A commercially available cellulose acetate film was dipped in a 1.5 mol/L sodium hydroxide aqueous solution of 55° C., and then the film was sufficiently washed with water to wash out the sodium hydroxide. Subsequently, the film was dipped in a 0.005 mol/L diluted sulfuric acid aqueous solution of 35° C. for 1 minute, and then dipped in water so as to sufficiently wash out the diluted sulfuric acid aqueous solution, followed by sufficiently drying the obtained sample at 120° C.

The multilayered optical film produced as above and the commercially available cellulose acetate film (protective layer) that had been subjected to a saponification treatment were bonded together using a polyvinyl alcohol adhesive so as to sandwich the above-noted polarizing film therebetween, thereby obtaining a polarizing plate. On that occasion, the liquid crystal compound layer of the multilayered optical film was disposed so as to constitute an outer surface of the polarizing plate. As for the commercially available cellulose acetate film, FUJITACK TF80UL (produced by FUJIFILM Corporation) was used. Since the polarizing film, the protective film disposed so as to constitute the outer surface of the polarizing film and the multilayered optical film were layered and rolled in the form of a roll, these roll films were continuously bonded to each other in a state where the longitudinal directions of the respective roll films were parallel to each other. Accordingly, the longitudinal direction of the multilayered optical film roll (flow-casting direction of the cellulose acetate film) was parallel to the polarizer absorption axis.

(Production of TN Mode Liquid Crystal Cell)

A pair of polarizing plates that have been provided to a liquid crystal display device using a TN mode liquid crystal cell (AL2216W, manufactured by Acer Inc.) were peeled off. In place of the polarizing plates, a pair of the above-produced polarizing plates were attached one by one to the viewer side and the back light side of the liquid crystal display device via an adhesive so that the optical film faced to the liquid crystal cell. On that occasion, the pair of polarizing plates were placed so that a transmission axis of the viewer-side polarizing plate was orthogonal to a transmission axis of the back light-side polarizing plate.

Figure 1:
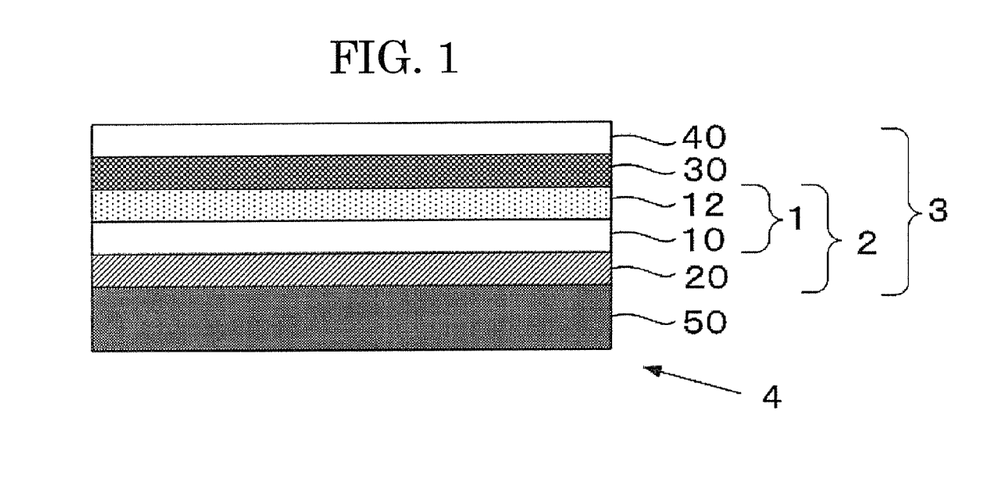
FIG. 1 is an explanatory view schematically illustrating a liquid crystal display device.

FIG. 1 is an explanatory view schematically illustrating the above-mentioned liquid crystal display device. In FIG. 1, a reference numeral 4 denotes a liquid crystal display device, a reference numeral 1 denotes an optical film, a reference numeral 2 denotes an optical film (multilayered optical film), a reference numeral 3 denotes a polarizing plate, a reference numeral 10 denotes a first optically anisotropic layer, a reference numeral 12 denotes a second optically anisotropic layer, a reference numeral 20 denotes a liquid crystal optically anisotropic layer, a reference numeral 30 denotes a polarizer (polarizing film), a reference numeral 40 denotes a protective layer, and a reference numeral 50 denotes a liquid crystal cell.

Figure 2:
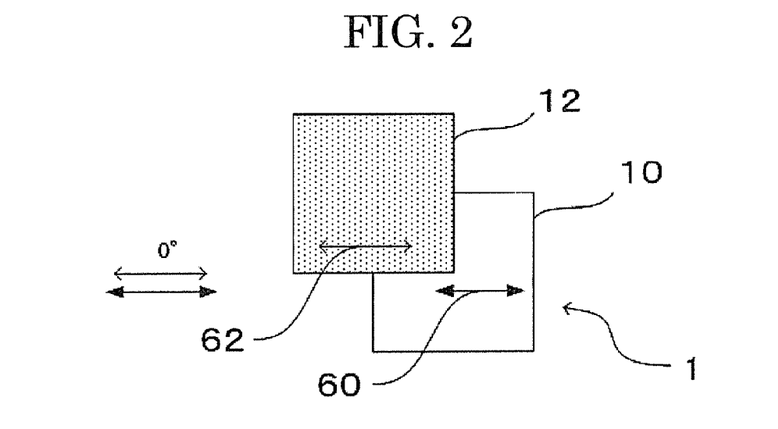
FIG. 2 is an explanatory view illustrating the relationship between two optically anisotropic layers laid in an optical film.

FIG. 2 is an explanatory view illustrating the positional relationship between slow axes of the two optically anisotropic layers laid in the optical film 1. As illustrated in FIG. 2, slow axes 60 and 62 of the two optically anisotropic layers 10 and 12 are parallel to each other.

On the produced liquid crystal display device, a luminance of black display (black luminance) and a luminance at white display (white luminance) were measured at an angle of 60 degrees on right and left sides of the screen using a luminance meter (BM-5, manufactured by TOPCOM Co.). Based on the resultant ratio between the black luminance and the white luminance, an average contrast (CR) value on the right and left sides thereof was calculated. Further, a luminance spectrometer (SR-3, manufactured by TOPCON Co.) was used to measure the color tint at front face in black state as well as the color tint (chromaticity) at an angle of 60 degrees on right and left sides of the screen. Table 1 shows the result of a difference in chromaticity (Δu 'v') between the color tint of the frontface of the screen and the color tint of the right-side of the screen viewed at an angle of 60 degrees on the right side thereof with respect to the front face, and also shows the result of bilateral symmetry (bilateral Δu 'v') which is a difference in chromaticity (Δu 'v') between the color tint of the left-side of the screen viewed at an angle of 60 degrees on the left side with respect to the front face and the color tint of the right-side thereof.

Evaluation criteria of average CR (contrast) on right and left sides of each liquid crystal display device are as follows:
A: 50 or higher
B: 40 or higher and lower than 50
C: lower than 40

Evaluation criteria of a difference in chromaticity between the front face and the right side are as follows:
A: front face Δu 'v'<0.05
B: 0.05≦front face Δu 'v'<0.08
C: 0.08≦front face Δu 'v'

Evaluation criteria of bilateral symmetry property are as follows:
A: bilateral Δu 'v'≦0.05
B: bilateral Δu 'v'>0.05

Example 2

(Production of Cyclic Polyolefin Film)

A commercially available cyclic polyolefin resin, ZEONOA#1600 (produced by Nippon Zeon Corp.) was extrusion-molded using a uniaxial melt extruder provided with a T-die at a melting temperature of 230° C. to thereby obtain a cyclic polyolefin film of 80 μm in thickness.

Next, the obtained cyclic polyolefin film was held by tenter clips of a tenter stretching machine, and heated at 150° C. and stretched in a conveyance zone therein, and then dried at 130° C. and wound up. The formed cyclic polyolefin film was found to have a thickness of 50 μm. The film was then subjected to a glow discharge treatment in between upper and lower brass-made electrodes (under argon gas atmosphere). In the glow discharge treatment, a high-frequency voltage of 3,000 Hz and 4,200 V was applied to the upper and lower brass-made electrodes, and the film was glow discharged for 20 seconds to thereby produce a ring-opening polymerization cyclic polyolefin film. The contact angle of the film surface with respect to pure water was in the range of from 37° to 41°. The contact angle was measured by a contact angle meter, model CA-X manufactured by Kyowa Interface Science Co., LTD. The slow axis of the cyclic polyolefin film was measured by a KOBRA 21 ADH (manufactured by Ohji Keisoku Kiki Co.) and found to be orthogonal to the conveying direction. Further, the ring-opening polymerization cyclic polyolefin film was found to have an Re value (550) of 58 nm, and an Rth value (550) of 29 nm. Also, it was found that the film had an Re value (450) of 57.4 nm, which was measured at a wavelength of 450 nm. Thus, the value Re (450)/Re (550) was 0.99.

(Lamination of Optical Film)

The cellulose acetate film produced in Example 1 with the liquid crystal compound layer formed on a surface thereof was vertically stacked over the cyclic polyolefin film produced in Example 2 via an adhesive SK-1478 (produced by Soken Chemical & Engineering Co., Ltd.) so that the cellulose acetate film surface side faced to the cyclic polyolefin film, thereby obtaining a multilayered optical film in which the liquid crystal compound layer, cellulose acetate film and cyclic polyolefin film were laid in this order.

(Properties of Multilayered Optical Film)

Separately to the above, the cellulose acetate film produced in Example 1 that had not yet been provided with a liquid crystal compound layer was vertically stacked over the cyclic polyolefin film produced in Example 2 via an adhesive SK-1478 (produced by Soken Chemical & Engineering Co., Ltd.) so that their slow axes were parallel to each other. The Re value (550) and Re value (450) of the optical film were measured using a KOBRA 21 ADH (manufactured by Ohji Keisoku Kiki Co.). It was found that the optical film had an Re value (550) of 78 nm and an Re value (450) of 65.4 nm. Thus, the value Re (450)/Re (550) was 0.84.

Further, according to the same manner as in Example 1, a pair of polarizing plates were produced using the optical film, and the obtained polarizing plates were mounted to a TN mode liquid crystal display device, followed by evaluation of contrast, color tint, and bilateral symmetry property of the TN mode liquid crystal display device. Table 1 shows the evaluation results.

Example 3

(Production of Cellulose Acetate Film)

Seven (7) parts by mass of the retardation increasing agent solution prepared in Example 1 was mixed in 474 parts by mass of the cellulose acetate solution prepared in Example 1, and the constituents were sufficiently stirred to thereby prepare a dope.

The obtained dope was flow-cast on a band stretching machine. After confirmation that the film surface temperature became 40° C., the film was dried by hot air of 70° C. for 1 minute. The film was separated from the band, dried by dry air of 140° C. for 10 minutes, and then laterally stretched by tenter clips while being conveyed on the casting roll to thereby prepare a cellulose acetate film containing 0.3% by mass of residual solvent (thickness: 55 μm). The Re retardation value and Rth retardation value at a wavelength of 550 nm of the prepared cellulose acetate film were measured using a KOBRA 21 ADH (manufactured by Ohji Keisoku Kiki Co.). The cellulose acetate film was found to have a slow axis orthogonal to the conveying direction, an Re value (550) of 18 nm, and an Rth value (550) of 30 nm. Also, it was found that the cellulose acetate film had an Re value (450) of 2 nm, which was measured at a wavelength of 450 nm. Thus, the value Re (450)/Re (550) was 0.11.

(Lamination of Optical Film)

A liquid crystal compound layer was formed over the cellulose acetate film produced in Example 3, in the same manner as in Example 1, and the cyclic polyolefin film produced in Example 1 was vertically stacked over the cyclic polyolefin film via an adhesive SK-1478 (produced by Soken Chemical & Engineering Co., Ltd.), thereby obtaining a multilayered optical film in which the liquid crystal compound layer, cellulose acetate film, and cyclic polyolefin film were laid in this order.

(Properties of Multilayered Optical Film)

Separately to the above, the cellulose acetate film produced in Example 3 that had not yet been provided with a liquid crystal compound layer was vertically stacked over the cyclic polyolefin film produced in Example 1 via an adhesive SK-1478 (produced by Soken Chemical & Engineering Co., Ltd.) so that their slow axes were parallel to each other. The Re value (550) and Re value (450) of the optical film were measured using a KOBRA 21 ADH (manufactured by Ohji Keisoku Kiki Co.). It was found that the optical film had an Re value (550) of 78 nm and an Re value (450) of 64.8 nm. Thus, the value Re (450)/Re (550) was 0.83.

Further, according to the same manner as in Example 1, a pair of polarizing plates were produced using the optical film, and the obtained polarizing plates were mounted to a TN mode liquid crystal display device, followed by evaluation of contrast, color tint, and bilateral symmetry property of the TN mode liquid crystal display device. Table 1 shows the evaluation results.

Example 4

(Production of Cellulose Acetate Film)

In a mixing tank, 16 parts by mass of a retardation increasing agent represented by the following structural formula, 80 parts by mass of methylene chloride, and 20 parts by mass of methanol were charged, and the constituents were stirred while heating to thereby prepare a retardation increasing agent solution 2.

In 487.7 parts by mass of the cellulose acetate solution prepared in Example 1, 10.3 parts by mass of the obtained retardation increasing agent solution 2 and 0.15 parts by mass of silica fine particles (AEROSIL R972 produced by Nippon Aerosil Co., Ltd.) were mixed, and sufficiently stirred to prepare a dope.

The additive amount of the following retardation increasing agent was 1.4 parts by mass per 100 parts by mass of the cellulose acetate. The additive amount of the silica fine particles was 0.15 parts by mass per 100 parts by mass of the cellulose acetate.

Retardation Increasing Agent

The obtained dope was flow-cast on a band stretching machine. After confirmation that the film surface temperature became 40° C., the film was dried by hot air of 70° C. for 1 minute. The film was separated from the band, dried by dry air of 140° C. for 10 minutes, and then laterally stretched by 35% using a tenter. Subsequently, the film was dried by dry air of 135° C. for 20 minutes to thereby prepare a cellulose acetate film containing 0.2% by mass of residual solvent (thickness: 78 μm). The Re retardation value and Rth retardation value at a wavelength of 550 nm of the prepared cellulose acetate film were measured using a KOBRA 21 ADH (manufactured by Ohji Keisoku Kiki Co.). The cellulose acetate film was found to have a slow axis orthogonal to the conveying direction, an Re value (550) of 60 nm, and an Rth value (550) of 33 nm. Also, it was found that the cellulose acetate film had an Re value (450) of 61.2 nm, which was measured at a wavelength of 450 nm. Thus, the value Re (450)/Re (550) was 1.02.

(Lamination of Optical Film)

The cellulose acetate film produced in Example 3 on which a liquid crystal compound layer had been formed was vertically stacked over the cellulose acetate film produced in Example 4 via an adhesive SK-1478 (produced by Soken Chemical & Engineering Co., Ltd.) so that the cellulose acetate film side surface of Example 3 faced to the cellulose acetate film of Example 4, thereby obtaining a multilayered optical film in which the liquid crystal compound layer, the cellulose acetate film of Example 3 and the cellulose acetate film of Example 4 were laid in this order.

(Properties of Multilayered Optical Film)

Separately to the above, the cellulose acetate film produced in Example 3 that had not yet been provided with a liquid crystal compound layer was vertically stacked over the cellulose acetate film produced in Example 4 via an adhesive SK-1478 (produced by Soken Chemical & Engineering Co., Ltd.) so that their slow axes were parallel to each other. The Re value (550) and Re value (450) of the optical film were measured using a KOBRA 21 ADH (manufactured by Ohji Keisoku Kiki Co.). It was found that the optical film had an Re value (550) of 78 nm and an Re value (450) of 63.2 nm. Thus, the value Re (450)/Re (550) was 0.81.

Further, according to the same manner as in Example 1, a pair of polarizing plates were produced using the optical film, and the obtained polarizing plates were mounted to a TN mode liquid crystal display device, followed by evaluation of contrast, color tint, and bilateral symmetry property of the TN mode liquid crystal display device. Table 1 shows the evaluation results.

Example 5

A cellulose acetate film provided with a liquid crystal compound layer on a surface thereof was produced in a similar manner to that described in Example 1 except that in formation of an alignment film, the alignment film was subjected to rubbing treatment at 45 degrees in a clockwise direction with respect to the longitudinal direction (0 degrees) of the film. Further, according to the same manner as in Example 1, the cellulose acetate film was vertically stacked over the cyclic polyolefin film.

Further, a pair of polarizing plates were produced using the optical film of Example 5 in a similar manner to that described in Example 1.

(Production of OCB Mode Liquid Crystal Cell)

Over two glass substrates provided with ITO transparent electrodes, a polyimide film was formed as an alignment film, and the alignment films were subjected to a rubbing treatment. The thus obtained two glass substrates were positioned apart to set a cell gap of 4.1 μm, so that the rubbing directions were parallel to each other. A liquid crystal compound having Δn (550) of 0.1396 (ZLI 1132, produced by Merck & Co., Inc.) was injected into the cell gap, thereby producing an OCB mode liquid crystal cell.

(Production and Evaluation of OCB Mode Liquid Crystal Display Device)

The liquid crystal cell was combined with two sheets of polarizing plates that had been produced as above to produce a liquid crystal display device. The liquid crystal cell and the two sheets of polarizing plates were disposed so that each liquid crystal compound layer of the polarizing plates faced to the substrate of the liquid crystal cell, and the rubbing direction of the liquid crystal cell was anti-parallel to the rubbing direction of the corresponding liquid crystal compound layer.

The produced liquid crystal display device was disposed above a back light, and a rectangular wave voltage of 55 Hz was applied to the OCB mode liquid crystal cell. A luminance meter (BM-5, manufactured by TOPCON Co.) was used while controlling the voltage to determine a voltage at which black luminance (front luminance) was the lowest.

The produced OCB mode liquid crystal display device was evaluated in the same manner as in Example 1. Table 1 shows the evaluation results.

Comparative Example 1

Production of an optical film, production of polarizing plates, and mounting of the polarizing plates to a TN mode liquid crystal display device were carried out in similar manners to those described in Example 1 except that no cyclic polyolefin film was formed in the optical film. Table 1 shows the evaluation results.

Comparative Example 2

Over a cyclic polyolefin film produced in Example 1, an alignment film was formed in a similar manner to that described in Example 1, and a liquid crystal compound layer was formed over the cyclic polyolefin film, thereby producing an optical film. Further, according to the same manner as in Example 1, a pair of polarizing plates were produced using the multilayered optical film, and the obtained polarizing plates were mounted to a TN mode liquid crystal display device, followed by evaluation of contrast, color tint, and bilateral symmetry property of the TN mode liquid crystal display device. Table 1 shows the evaluation results.

Comparative Example 3

(Production of Cellulose Acetate Film)

A cellulose acetate film was produced in a similar manner to that described in Example 4 except that the amount of the retardation increasing agent solution 2 was changed to 0.5 parts by mass. Note that the additive amount of the retardation increasing agent was 0.07 parts by mass per 100 parts by mass of the cellulose acetate.

The thus obtained cellulose acetate film had a thickness of 116 μm. The Re retardation value and Rth retardation value at a wavelength of 550 nm of the prepared cellulose acetate film were measured using a KOBRA 21 ADH (manufactured by Ohji Keisoku Kiki Co.). The cellulose acetate film was found to have a slow axis orthogonal to the conveying direction, an Re value (550) of 55 nm, and an Rth value (550) of 27 nm. Also, it was found that the cellulose acetate film had an Re value (450) of 44 nm, which was measured at a wavelength of 450 nm. Thus, the value Re (450)/Re (550) was 0.80.

(Lamination of Optical Film)

The cellulose acetate film produced in Example 1 on which a liquid crystal compound layer had been formed was vertically stacked over the cellulose acetate film produced in Comparative Example 3 via an adhesive SK-1478 (produced by Soken Chemical & Engineering Co., Ltd.) so that the cellulose acetate film side surface of Example 1 faced to the cellulose acetate film of Comparative Example 3, thereby obtaining a multilayered optical film in which the liquid crystal compound layer, the cellulose acetate film of Example 1 and the cellulose acetate film of Comparative Example 3 were laid in this order.

(Properties of Multilayered Optical Film)

Separately to the above, the cellulose acetate film produced in Example 1 that had not yet been provided with a liquid crystal compound layer was vertically stacked over the cellulose acetate film produced in Comparative Example 3 via an adhesive SK-1478 (produced by Soken Chemical & Engineering Co., Ltd.) so that their slow axes were parallel to each other. The Re value (550) and Re value (450) of the optical film were measured using a KOBRA 21 ADH (manufactured by Ohji Keisoku Kiki Co.). It was found that the optical film had an Re value (550) of 75 nm and an Re value (450) of 52 nm. Thus, the value Re (450)/Re (550) was 0.69.

Further, according to the same manner as in Example 1, a pair of polarizing plates were produced using the optical film, and the obtained polarizing plates were mounted to a TN mode liquid crystal display device, followed by evaluation of contrast, color tint, and bilateral symmetry property of the TN mode liquid crystal display device. Table 1 shows the evaluation results.

Comparative Example 4

The optical film produced in Comparative Example 2 in which a liquid crystal compound layer had been formed on a cyclic polyolefin film, and the cyclic polyolefin film produced in Example 2 were used and multilayered so that their slow axes of the cyclic polyolefin films were parallel to each other, thereby producing a multilayered optical film.

(Properties of Multilayered Optical Film)

Separately to the above, the cyclic polyolefin film produced in Comparative Example 2 that had not yet been provided with a liquid crystal compound layer was vertically stacked over the cyclic polyolefin film produced in Example 2 via an adhesive SK-1478 (produced by Soken Chemical & Engineering Co., Ltd.) so that their slow axes were parallel to each other. The Re value (550) and Re value (450) of the optical film were measured using a KOBRA 21 ADH (manufactured by Ohji Keisoku Kiki Co.). It was found that the optical film had an Re value (550) of 118 nm and an Re value (450) of 119.2 nm. Thus, the value Re (450)/Re (550) was 1.01.

Further, according to the same manner as in Example 1, a pair of polarizing plates were produced using the optical film, and the obtained polarizing plates were mounted to a TN mode liquid crystal display device, followed by evaluation of contrast, color tint, and bilateral symmetry property of the TN mode liquid crystal display device. Table 1 shows the evaluation results.

Comparative Example 5

The optical film produced in Example 1 that had been formed of a liquid crystal compound layer and a cellulosed acetate film was stacked over the cyclic polyolefin film produced in Example 1 so that the slow axis of the cellulose acetate film was disposed at an angle of 10 degrees with respect to the slow axis of the cyclic polyolefin film, thereby obtaining a multilayered optical film.

(Properties of Multilayered Optical Film)

Separately to the above, the cellulose acetate film produced in Example 1 that had not yet been provided with a liquid crystal compound layer was vertically stacked over the cyclic polyolefin film of Example 1 via an adhesive SK-1478 (produced by Soken Chemical & Engineering Co., Ltd.) so that the slow axis of the cellulose acetate film was disposed at an angle of 10 degrees with respect to the slow axis of the cyclic polyolefin film. The Re value (550) and Re value (450) of the optical film were measured using a KOBRA 21 ADH (manufactured by Ohji Keisoku Kiki Co.). It was found that the optical film had an Re value (550) of 79.1 nm and an Re value (450) of 68.9 nm. Thus, the value Re (450)/Re (550) was 0.87.

Further, according to the same manner as in Example 1, a pair of polarizing plates were produced using the optical film, and the obtained polarizing plates were mounted to a TN mode liquid crystal display device, followed by evaluation of contrast, color tint, and bilateral symmetry property of the TN mode liquid crystal display device. Table 1 shows the evaluation results.

Comparative Example 6

The optical film produced in Example 1 that had been formed of a liquid crystal compound layer and a cellulosed acetate film was stacked over the cyclic polyolefin film produced in Example 1 so that the slow axis of the cellulose acetate film was disposed at an angle of 80 degrees with respect to the slow axis of the cyclic polyolefin film, thereby obtaining a multilayered optical film.

(Properties of Multilayered Optical Film)

Separately to the above, the cellulose acetate film produced in Example 1 that had not yet been provided with a liquid crystal compound layer was vertically stacked over the cyclic polyolefin film of Example 1 via an adhesive SK-1478 (produced by Soken Chemical & Engineering Co., Ltd.) so that the slow axis of the cellulose acetate film was disposed at an angle of 80 degrees with respect to the slow axis of the cyclic polyolefin film. The Re value (550) and Re value (450) of the optical film were measured using a KOBRA 21 ADH (manufactured by Ohji Keisoku Kiki Co.). It was found that the optical film had an Re value (550) of 39.1 nm and an Re value (450) of 52.9 nm. Thus, the value Re (450)/Re (550) was 1.35.

Further, according to the same manner as in Example 1, a pair of polarizing plates were produced using the optical film, and the obtained polarizing plates were mounted to a TN mode liquid crystal display device, followed by evaluation of contrast, color tint, and bilateral symmetry property of the TN mode liquid crystal display device. Table 1 shows the evaluation results.

TABLE 1

| | Expression (1) | Expression (2) | Relative angular displacement of axes | Mode | CR | Color tint | Bilateral symmetry property |
|---|---|---|---|---|---|---|---|
| Ex. 1 | 0.4 | 1.03 | Parallel | TN | A | A | A |
| Ex. 2 | 0.4 | 0.99 | Parallel | TN | A | A | A |
| Ex. 3 | 0.1 | 1.03 | Parallel | TN | A | A | A |
| Ex. 4 | 0.1 | 1.02 | Parallel | TN | A | A | A |
| Ex. 5 | 0.4 | 1.03 | Parallel | OCB | A | B | A |
| Compara. Ex. 1 | 0.4 | — | — | TN | B | B | A |
| Compara. Ex. 2 | — | 1.03 | — | TN | C | C | A |
| Compara. Ex. 3 | 0.4 | 0.8 | Parallel | TN | B | B | A |
| Compara. Ex. 4 | 1.03 | 0.99 | Parallel | TN | C | C | A |
| Compara. Ex. 5 | 0.4 | 1.03 | 10 degrees | TN | A | A | B |
| Compara. Ex. 6 | 0.4 | 1.03 | 80 degrees | TN | C | C | B |

What is claimed is:

1. An optical film comprising:
   at least two optically anisotropic layers,
   wherein one optically anisotropic layer satisfies Expression (1) described below, the other optically anisotropic layer satisfies Expression (2) described below, and a slow axis of the one optically anisotropic layer is parallel to a slow axis of the other optically anisotropic layer, $$0 \leq Re(450)/Re(550) \leq 0.5 \quad \text{Expression (1)}$$

$$0.95 \leq Re(450)/Re(550) \leq 1.05 \quad \text{Expression (2)}$$

where Re (λ) represents an in-plane retardation value (unit: nm) of the corresponding optically anisotropic layer measured at a wavelength of λ nm.

2. The optical film according to claim 1, being a two-layered laminate composed of a first optically anisotropic layer and a second optically anisotropic layer, wherein the two-layered laminate satisfies the following Expression (3), $$0.75 \leq Re(450)/Re(550) \leq 0.95 \quad \text{Expression (3)}$$

where Re (λ) represents an in-plane retardation value (unit: nm) of the laminate measured at a wavelength of λ nm.

3. The optical film according to claim 1, further comprising an optically anisotropic layer which contains a liquid crystal compound.

4. The optical film according to claim 3, wherein the liquid crystal compound contains a discotic liquid crystal compound.

5. The optical film according to claim 1, wherein the one optically anisotropic layer satisfying Expression (1) comprises cellulose acetate, and the other optically anisotropic layer satisfying Expression (2) comprises at least one of a cyclic olefin homopolymer and a cyclic olefin copolymer.

6. A polarizing plate comprising:
   an optical film, and
   a polarizer,
   wherein the optical film comprises at least two optically anisotropic layers,
   wherein one optically anisotropic layer satisfies Expression (1) described below, the other optically anisotropic layer satisfies Expression (2) described below, and a slow axis of the one optically anisotropic layer is parallel to a slow axis of the other optically anisotropic layer, $$0 \leq Re(450)/Re(550) \leq 0.5 \quad \text{Expression (1)}$$

$$0.95 \leq Re(450)/Re(550) \leq 1.05 \quad \text{Expression (2)}$$

where Re (λ) represents an in-plane retardation value (unit: nm) of the corresponding optically anisotropic layer measured at a wavelength of λ nm.

7. A liquid crystal display device comprising:
   a liquid crystal cell, and
   polarizing plates,
   wherein the polarizing plates each comprise at least an optical film and a polarizer,
   wherein the optical film comprises at least two optically anisotropic layers, and
   wherein one optically anisotropic layer satisfies Expression (1) described below, the other optically anisotropic layer satisfies Expression (2) described below, and a slow axis of the one optically anisotropic layer is parallel to a slow axis of the other optically anisotropic layer, $$0 \leq Re(450)/Re(550) \leq 0.5 \quad \text{Expression (1)}$$

$$0.95 \leq Re(450)/Re(550) \leq 1.05 \quad \text{Expression (2)}$$

where Re (λ) represents an in-plane retardation value (unit: nm) of the corresponding optically anisotropic layer measured at a wavelength of λ nm.

8. The liquid crystal display device according to claim 7, wherein the liquid crystal cell is a TN mode liquid crystal cell or an OCB mode liquid crystal cell.

* * * * *